United States Patent [19]

Asada

[11] Patent Number: 5,763,783
[45] Date of Patent: Jun. 9, 1998

[54] ACCELERATION SENSOR

[75] Inventor: Norihiro Asada, Urawa, Japan

[73] Assignee: The Nippon Signal Co., Ltd., Tokyo, Japan

[21] Appl. No.: 693,282

[22] PCT Filed: Dec. 13, 1995

[86] PCT No.: PCT/JP95/02556

§ 371 Date: Aug. 7, 1996

§ 102(e) Date: Aug. 7, 1996

[87] PCT Pub. No.: WO96/19733

PCT Pub. Date: Jun. 27, 1996

[30] Foreign Application Priority Data

Dec. 20, 1994 [WO] WIPO .............. PCT/JP94/02158

[51] Int. Cl.[6] ......................................... G01P 15/11
[52] U.S. Cl. .................................................. 73/514.31
[58] Field of Search ....................... 73/514.31, 514.17, 73/514.24, 514.38, 514.16; 324/207.17

[56] References Cited

U.S. PATENT DOCUMENTS 5,524,490  6/1996  Lautzenhiser et al. .............. 73/514.31

FOREIGN PATENT DOCUMENTS

| | | |
|---|---|---|
| 57-125355 | 8/1982 | Japan . |
| 59-99356 | 6/1984 | Japan . |
| 5-26902 | 2/1993 | Japan . |
| 5-142246 | 6/1993 | Japan . |

*Primary Examiner*—John E. Chapman
*Attorney, Agent, or Firm*—Wolf, Greenfield & Sacks, P.C.

[57] ABSTRACT

The present invention relates to an acceleration sensor which uses magnetic coupling to detect acceleration. A mass portion 3 is movably supported on a frame 2 by means of support beams 4. A first planar coil 5 is disposed on the mass portion 3, and a second planar coil 8 is provided facing the first planar coil 5 with a space therebetween. A transformer is made up with the first planar coil 5 as the primary winding and the second planar coil 8 as the secondary winding. Acceleration is obtained using magnetic coupling to detect the change in the distance between the coils, that is to say, the displacement of the mass portion.

10 Claims, 7 Drawing Sheets

GAP BETWEEN COILS d (μm)

ACCELERATION SENSOR

TECHNICAL FIELD

The present invention relates to an acceleration sensor, and in particular to an acceleration sensor which can be easily miniaturized and made thin, with high accuracy and low production cost.

BACKGROUND ART

Acceleration sensors wherein a semiconductor substrate is processed using micro-machining technology to achieve miniaturization and thin shape are known. With these acceleration sensors, devices such as capacitance type, piezoelectric-resistance type, and induced current type devices have been proposed.

A capacitance type device is disclosed for example in Japanese Unexamined Patent Publication No. 57-125355.

With this device, a V-shaped groove is formed in a substrate, and a cantilever beam supported at one end, is positioned in the V-shaped groove. Respective electrodes are positioned facing each other on mutually opposed inclined faces of the V-shaped groove and inclined faces of the beam. When subjected to acceleration, the beam is displaced corresponding to the magnitude of the acceleration, the amount of displacement being detected as a change $\Delta C$ in electrostatic capacity C between the electrodes, to thereby detect the acceleration.

With the device of the abovementioned disclosure however, due to the cantilever construction the beam can move in two directions, namely up and down and sideways, thus giving two axes which are sensitive to the acceleration. Hence with acceleration in the up/down direction for example there is the possibility of sideways displacement of the beam. In this case, the output change component due to the sideways direction change must be removed, and hence a compensating circuit is required, resulting in a complicated circuit structure. Moreover, there are problems when the displacement amount is large, due for example to the displacement amount of the portion towards the non supported end of the beam being greater than that of the portion towards the supported end, the gap between the electrodes is no longer uniform.

In the case of the capacitance type acceleration sensor, to increase detection sensitivity, the change amount $\Delta C$ of the electrostatic capacity C can be increased, and to achieve this the original electrostatic capacity C can be increased. Since the electrostatic capacity C is given by $C = \epsilon \cdot A/d$ (where $\epsilon$ is the dielectric constant), with A as the surface area of the electrode and d as the electrode gap, then one method of increasing the electrostatic capacity C, is to increase the electrode surface area A or decrease the electrode gap d.

However, increasing the electrode surface area A results in an increase in sensor size. Hence from the point of sensor miniaturization, it is better to reduce the gap d between the electrodes. However, if the actual gap d between the electrodes is made very narrow of the order of 2–3 μm, then production yield is extremely poor due for example to dust becoming attached in the gap between the electrodes during the manufacturing process. Moreover, if the actual gap between the electrodes is reduced, then the dynamic range of the sensor is reduced. There are also problems due for example to the difficulty in making the narrow gap uniform. Furthermore, once an electrode pair becomes stuck together, since the sticking force by the electrostatic attraction is strong, the device becomes inoperable.

As an improved form of the capacitance type device which avoids inoperability due to sticking and gives an increase in the dynamic range, there is the electrostatic servo type device disclosed for example in Japanese Unexamined Patent Publication No. 5-26902.

With this device, a movable electrode is provided between two fixed electrodes, the arrangement being such that when the movable electrode is displaced due to acceleration, a voltage corresponding to the difference in electrostatic capacity caused by the displacement of the movable electrode, is fed back to the electrode section to control the movable electrode so that the difference in electrostatic capacity becomes zero. The voltage at this time is then taken out as an acceleration detection signal.

With this arrangement however, it is difficult to separate the detection voltage from the voltage for the electrostatic attraction applied to the electrodes to maintain a constant spacing between the fixed electrodes and the movable electrode. Moreover the circuit for treating the output from the sensor section is complicated.

A piezoelectric-resistance type acceleration sensor is disclosed for example in Japanese Unexamined Patent Publication No. 59-99356.

With this device, a mass portion at the center of a silicon substrate is supported by four beams extending perpendicular to each other. Piezoelectric-resistance elements are provided at the roots of each beam, these piezoelectric-resistance elements making up a bridge circuit from which is taken an output corresponding to the acceleration.

However, due to the small amount of change in the piezoelectric-resistance elements with acceleration, a complicated detection circuit is required. Furthermore, since a temperature coefficient of semiconductor resistance is large, a temperature compensating circuit is also required.

An induced current type acceleration sensor is disclosed for example in Japanese Unexamined Patent Publication No. 5-142246.

With this device, a mass portion is provided resiliently supported at the center of an open frame by four beams, with a permanent magnet provided on an upper face thereof. Covers are provided on the top and bottom of the frame, with a coil for detecting a change in magnetic field being provided on the inner face of the top cover, facing the permanent magnet. When the mass portion is displaced due to acceleration, the magnetic flux of the permanent magnet passing the detection coil changes, causing an induced current to flow in the detection coil. The acceleration is then detected from changes in this induced current.

With this acceleration sensor, since the induced current in the detection coil is solely a result of the change in magnetic flux, then the induced current is only produced in the detection coil when the permanent magnet is moving, that is to say when the mass portion is displaced. Consequently, when under constant acceleration with no movement of the mass portion, it is not possible to detect acceleration. Moreover, what is detected by this acceleration sensor is the change component of the acceleration. Hence in order to detect pure acceleration, it is necessary to have a circuit for integrating the detection signal, thus increasing complexity.

In view of the foregoing, it is an object of the present invention to provide an acceleration sensor constructed so as to utilize magnetic coupling to detect acceleration, thereby enabling a wide dynamic range, as well as extremely low production costs with high accuracy and simple circuit structure, thus facilitating miniaturization and thin construction.

DISCLOSURE OF THE INVENTION

Accordingly, the acceleration sensor of the present invention comprises: an open frame; a mass portion which is displaced in response to an acceleration, with a periphery thereof supported on the frame by means of support beams having a resilient restoring force; a first planar coil disposed on a surface normal to the displacement direction of the mass portion; and a second planar coil disposed facing the first planar coil with a space therebetween; and has a sensor section with a transformer made up of the first planar coil and the second planar coil; the construction being such that under conditions wherein an alternating current signal is applied to the first planar coil, an electrical signal proportional to a change in the space between the first planar coil and the second planar coil corresponding to acceleration, is taken out from the second planar coil.

With such a construction, the first and second planar coils make up a transformer, the magnetic coupling thereof being used to detect displacement of the mass portion corresponding to the acceleration. Therefore, compared to the capacitance type device, the spacing between the two coils can be much wider, and when a semiconductor substrate is used, there is no influence from the attachment of foreign matter. Production yield is thus improved, so that production costs can be lowered. Moreover, since sensitivity can be adjusted by changing the number of windings of the coil, then high sensitivity is possible even with a large dynamic range.

The mass portion may be supported on the frame at four locations on central mutually perpendicular axes. With this construction, the displacement direction of the mass portion can be positively controlled along a single axis, thus obviating the treatment to separate the outputs in the case of the construction with multi-axis sensitivity.

The sensor section may be formed by processing a semiconductor substrate using micro-machining technology, and can thus be easily miniaturized and made thin.

Moreover, the construction may comprise an oscillator for applying an alternating current signal to the first planar coil of the sensor section, and an electronic circuit for computing acceleration based on an electrical signal output from the second planar coil.

The electronic circuit may comprise: a rectifying circuit for rectifying the alternating current electrical signal output from the second planar coil; an analog-digital converter for converting the rectified output from the rectifying circuit into a digital signal; and a microcomputer for computing acceleration based on the digital output from the analog-digital converter. In this case, by making the rectifying circuit a voltage doubler rectifying circuit, then a large output change can be taken out therefrom, and sensitivity thus increased.

If the construction is such that a sensor section is disposed on each of two mutually perpendicular faces, then acceleration detection in two directions is possible.

Moreover, if the construction is such that a sensor section is disposed on each of three mutually perpendicular faces, then acceleration detection in three directions is possible. The device thus becomes applicable for example to navigation systems incorporating a gyroscope, or to position detection systems for self-propelled robots.

Furthermore, if the construction is such that the sensor section incorporates magnetic bodies respectively provided in the vicinity of the first planar coil and the second planar coil, then the inductance of the coils can be improved, making the two coils more closely coupled, and hence increasing sensitivity.

If the construction is such that the respective magnetic bodies are formed as sheets laid onto the sensor section, then the manufacturing costs for the magnetic bodies can be reduced, and assembly of the sensor section simplified.

BEST MODE FOR CARRYING OUT THE INVENTION

As follows is a description of a first embodiment of the present invention with reference to the drawings.

FIGS. 1–4 show the construction of an acceleration sensor according to the present invention.

Figure 1:
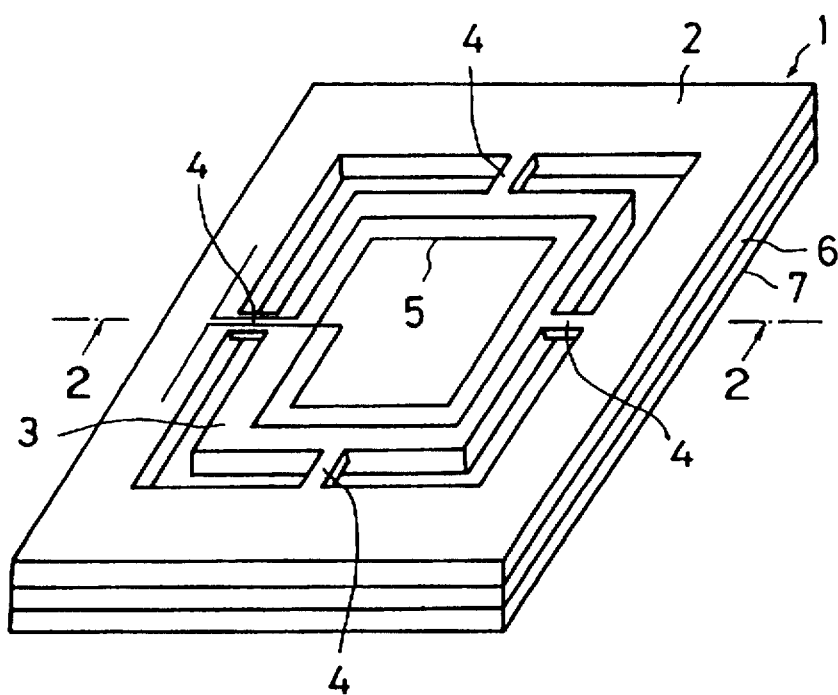
FIG. 1 is a schematic diagram of a first embodiment of a sensor section of an acceleration sensor according to the present invention.
Figure 2:
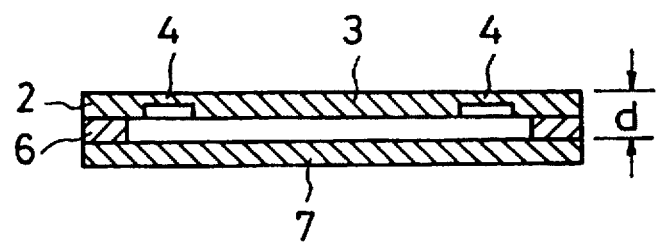
FIG. 2 is a cross-sectional view of a region indicated by arrows A—A in FIG. 1.
Figure 3:
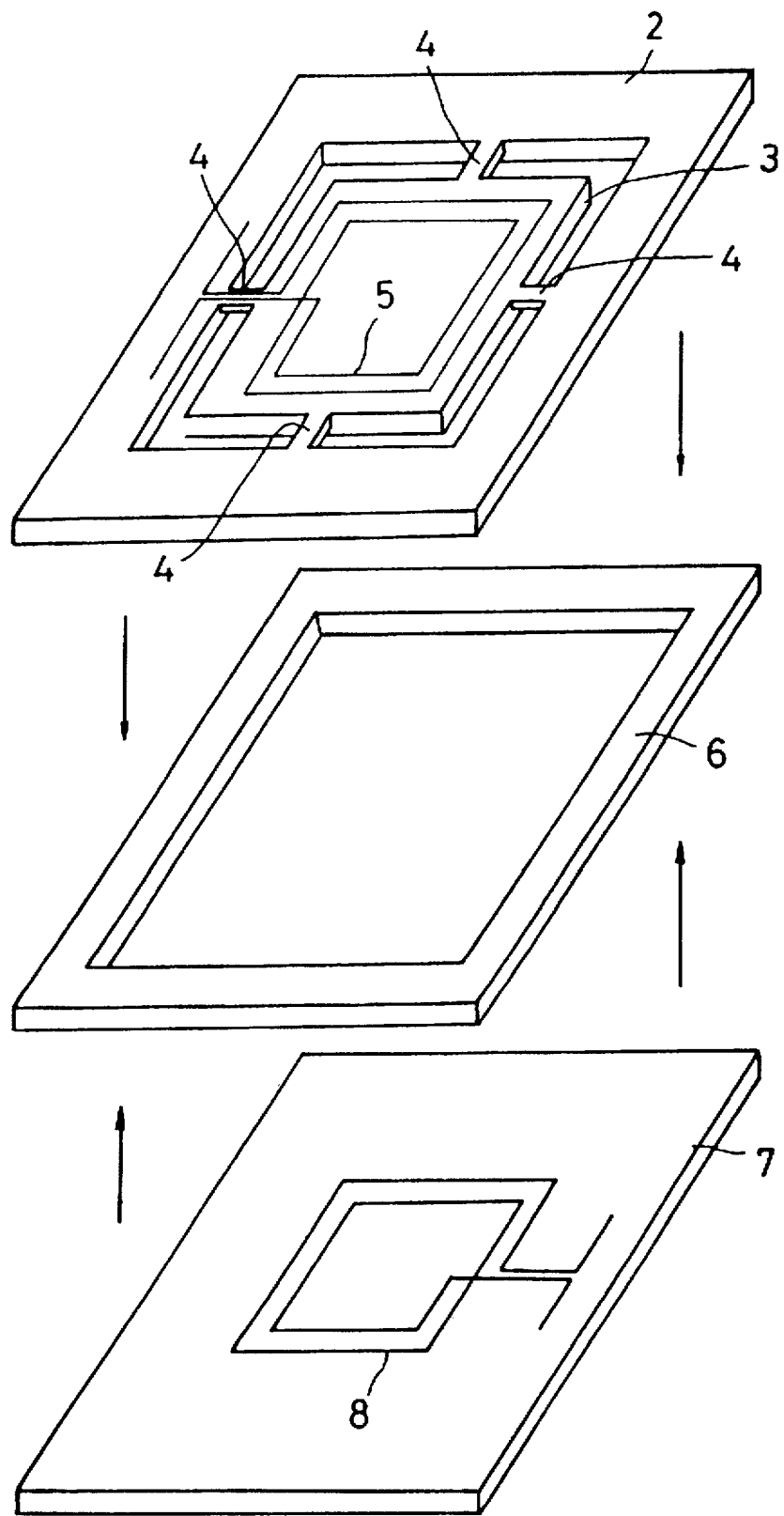
FIG. 3 is an exploded view of the sensor section.

The construction of the sensor section is shown in FIGS. 1–3. In these figures, a sensor section 1 has a mass portion 3 disposed within an open frame 2. The mass portion 3 is supported on the frame 2 at four locations on central mutually perpendicular axes, that is to say at approximately central locations on the respective sides of the mass portion 3, by means of four support beams 4. The support beams 4 are formed thinner than the thickness of the frame 2 and the mass portion 3, and have a resilient restoring force. Consequently, the construction is such that the mass portion 3 is movable in response to acceleration along a single axis (up/down) direction only.

A thin film first planar coil 5 is provided on an upper face of the mass portion 3, and a thin film second planar coil 8 is provided opposite to the first planar coil 5 on an upper face of a planar base 7 which opposes the frame 2 by way of a frame shaped spacer 6. The two coils 5 and 8 make up a transformer with the first planar coil 5 as the primary winding and the second planar coil 8 as the secondary winding. The respective thicknesses of the frame 2 and the spacer 6 are for example 200 μm, thus giving a transformer with a gap d between the coils of 400 μm.

The frame 2, the support beams 4 and the mass portion 3 are integrally formed by machining a silicon substrate using micro-machining techniques. The spacer 6 and the base 7 are similarly formed by machining silicon substrates. The sensor section 1 is made up as shown in FIG. 3, by laying the individually formed components on top of each other.

Figure 4:
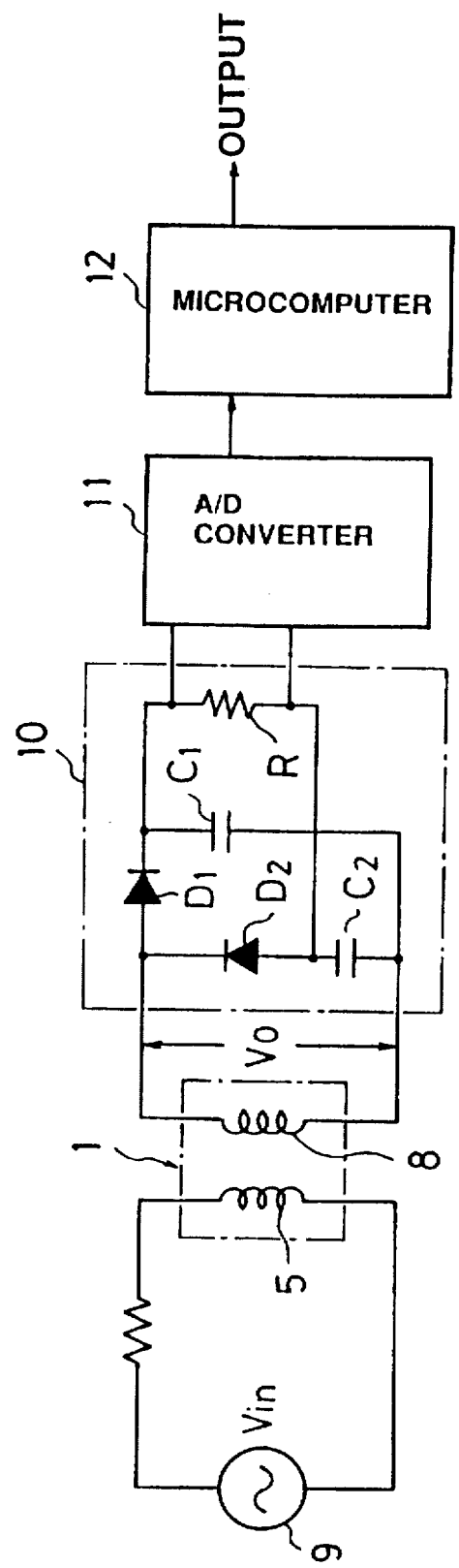
FIG. 4 is a circuit diagram for the acceleration sensor.

FIG. 4 shows a circuit structure for the acceleration sensor of the first embodiment.

In FIG. 4, an oscillator 9 is connected to the first planar coil 5 of the sensor section 1, and applies an AC voltage thereto via a resistor. A rectifying circuit such as a voltage doubler rectifying circuit 10 comprising two diodes D1, D2, two capacitors C1, C2 and a resistor R, is connected to the second planar coil 8 serving as the secondary winding. The rectified analog output from the voltage doubler rectifying circuit 10 is converted into a digital signal by means of an analog-digital converter 11 (referred to hereunder as an A/D converter), and then input to a microcomputer 12.

The operation of the acceleration sensor of the above construction will now be described.

When an acceleration in the up/down direction in FIG. 1 acts on the sensor section 1, the mass portion 3 is displaced in the opposite direction to the acceleration direction so that the gap d between the first planar coil 5 and the second planar coil 8 changes. As a result, the coupling coefficient of the transformer comprising the first planar coil 5 (primary winding) and the second planar coil 8 (secondary winding) changes, causing a change in the output voltage from the second planar coil 8.

The relationship between input voltage Vin and output voltage Vo of the transformer is given by the following equation. This equation however is for the ideal case where there is no DC resistance component in the coil.

$$Vo = \omega \cdot k \cdot Vin$$

Here k is the transformer coupling coefficient, and $\omega$ is the frequency of the input voltage.

From the above equation, the coupling coefficient k and the output voltage Vo are proportionally related, hence if $\omega$ and Vin are constant, the coupling coefficient k can be obtained by detecting the output voltage Vo from the secondary winding. The coupling coefficient k corresponds to the gap d between the first planar coil 5 and the second planar coil 8 caused by displacement of the mass portion 3. Hence if the relationship between the coupling coefficient k and the gap d is obtained beforehand as a characteristic of the sensor section 1, then the gap d between the two coils 5 and 8, that is to say the displacement amount of the mass portion 3, can be determined from the coupling coefficient k obtained for the detected output voltage Vo, to thus detect the acceleration.

Figure 5:
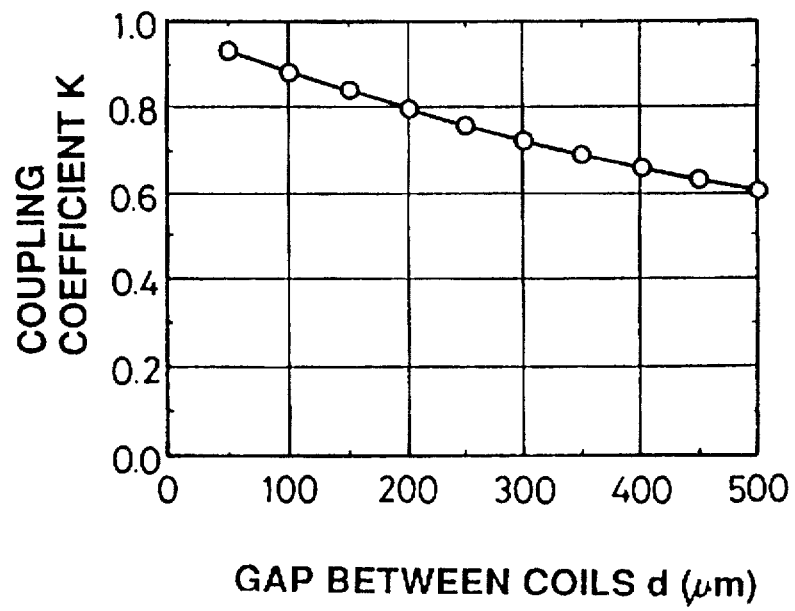
FIG. 5 is a graph showing an example of the relationship between coupling coefficient and gap between coils.

FIG. 5 shows an example of the relationship of the coupling coefficient k to the gap d between the two coils.

A map representing the relationship of the coupling coefficient k to the gap d between the coils can thus be stored beforehand in the microcomputer 12. Then when the output voltage Vo from the second planar coil 8 of the sensor section 1 is rectified by the voltage doubler rectifying circuit 10, converted into a digital signal by the A/D converter 11, and input to the microcomputer 12, the coupling coefficient k can be computed by the microcomputer 12, and the gap d between the coils then obtained from the previously stored map for the relationship of the coupling coefficient k to the gap d between the coils. Hence the displacement amount of the mass portion 3 can be detected to thus detect the acceleration.

For example, in the case where the input voltage Vin is 10 V AC, and the gap d changes from 50 μm to 100 μm, then from the characteristics of FIG. 5, the coupling coefficient changes from 0.96 to 0.94, and if $\omega=1$, then the output voltage Vo changes from 9.6 V to 9.4 V. Hence in this case the change component of the output is 200 mV.

This output change of 200 mV is a large value which can be easily detected. Hence a much larger change can be output compared to with the capacitance type or piezoelectric-resistance type acceleration sensor, thus enabling high accuracy acceleration detection. Moreover, the gap d between the two coils 5 and 8 can be several hundred microns, being much larger than the 2–3 μm for the capacitance type sensor. Hence the dynamic range can be increased, and there is no influence from dust becoming attached between the mass portion 3 and the base 7, thus simplifying production and improving yield, so that production costs can be lowered. Also, since the mass portion 3 is supported in all directions by the four support beams 4, so that the direction of movement of the mass portion 3 in response to acceleration is controlled to one direction, then the circuit for separating the output components required with the construction having multi-axis sensitivity is unnecessary. The construction of the processing circuit for processing the output signal from the sensor section 1 can thus be simplified. Furthermore, by making the first and second planar coils 5 and 8 using semiconductor manufacturing techniques, then the winding spacing can be made to a higher accuracy than for the case of hand wound or machine wound coils. Production of a transformer having performance values close to the ideal value according to the calculation equation for ideal mutual inductance and self inductance is thus possible. Hence acceleration detection accuracy can be improved. Furthermore, by using the voltage doubler rectifying circuit 10 in the rectifying circuit for rectifying the output from the sensor section 1, then the output voltage and hence the resolution can be increased, and detection accuracy improved.

Figure 6:
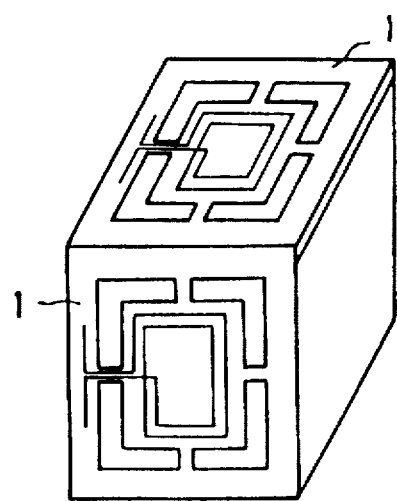
FIG. 6 is an example of a construction for detecting acceleration in two directions.

The above embodiment has been described in relation to the case of one sensor section 1, capable of detecting acceleration in one direction. However by arranging a sensor section 1 on each of two mutually perpendicular faces as shown in FIG. 6, then acceleration can be detected in two directions, that is to say two dimensional acceleration detection becomes possible. Moreover, by arranging a sensor section 1 on each of three mutually perpendicular faces as shown in FIG. 7, then three dimensional acceleration detection becomes possible.

Figure 7:
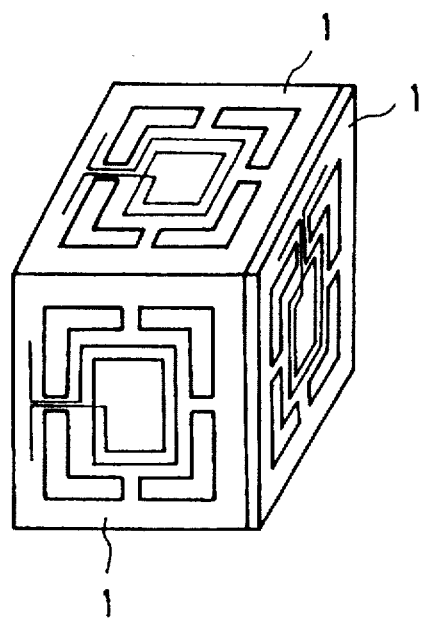
FIG. 7 is an example of a construction for detecting acceleration in three directions.

The construction as shown in FIG. 7 enabling three dimensional acceleration detection is applicable to navigation systems for automobiles and the like, or to position detection systems for self-propelled robots. The one dimensional acceleration detection construction may be applied for example to active suspension units in automobiles.

Figure 8:
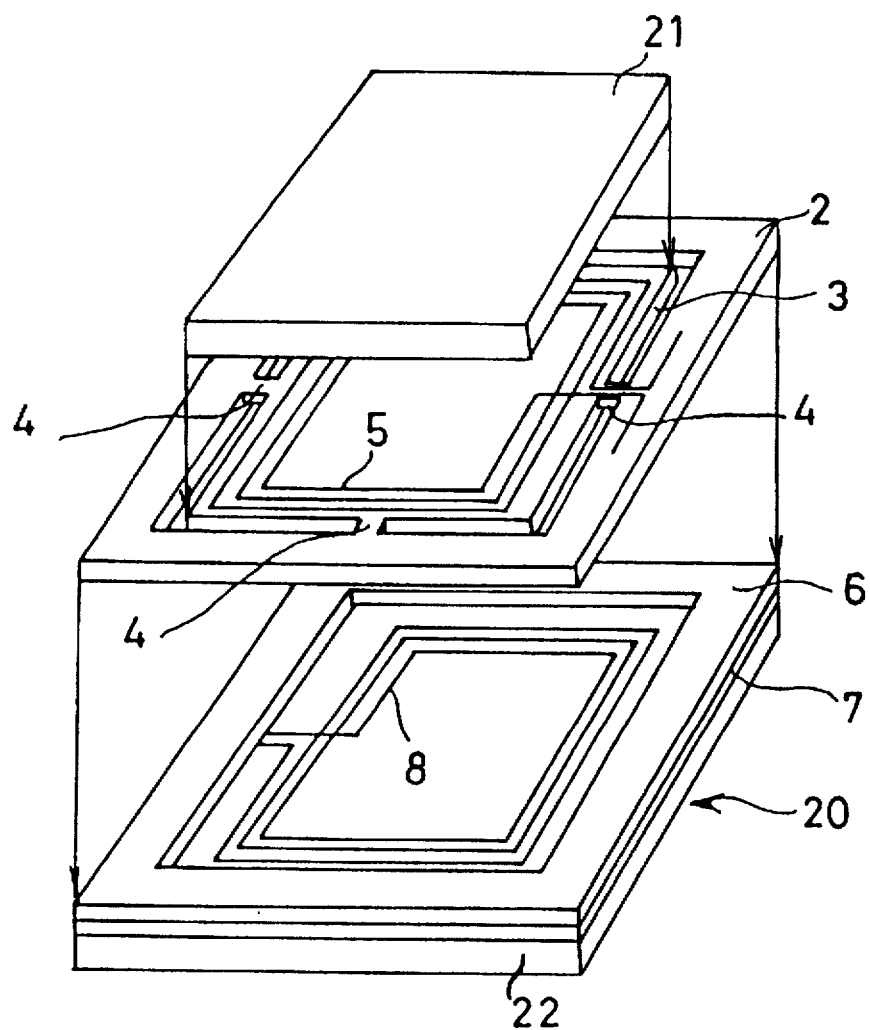
FIG. 8 is a schematic diagram of another embodiment of a sensor section of an acceleration sensor according to the present invention.

FIG. 8 shows another embodiment of a sensor section of an acceleration sensor of the present invention.

The embodiment of FIG. 8 is an example of a case wherein a magnetic body is attached to the sensor section shown in FIG. 1, to improve the sensitivity of the acceleration sensor. Elements the same as in the embodiment of FIG. 1 are indicated by the same symbol, and description is omitted.

In FIG. 8, a sensor section 20 of the embodiment has a mass portion 3 which is provided with a thin film first planar coil 5, positioned within an open frame 2 by means of four support beams 4 having a resilient restoring force. A base 7 which is provided with a second planar coil 8, is positioned in the same manner as for the sensor section 1 of FIG. 1, by way of a frame shaped spacer 6, so as to have a predetermined distance from the mass portion 3. The upper surface of the mass portion 3 and the lower surface of the base 7 are respectively affixed with first and second planar magnetic bodies 21 and 22.

The first magnetic body 21 is formed as a plate of approximately the same size as the mass portion 3, and is affixed so as to cover the upper face thereof. The first magnetic body 21 thus constitutes part of the mass portion 3, moving as one with the mass portion 3 in response to acceleration. The second magnetic body 22 is formed as a plate of approximately the same size as the base 7 provided with the second planar coil 8, and is affixed to the lower face of the base 7. The first and second magnetic bodies 21 and 22 are made for example from a Mn—Zn ferrite material.

With such a construction, the first and second magnetic bodies 21 and 22 perform the function of an iron core for the transformer comprising the first and second planar coils 5 and 8, thus increasing the inductance of the first and second planar coils 5 and 8. As a result, when a current flows in the first planar coil 5, the resultant magnetic flux density is increased. Since with an increase in magnetic flux density, there is also an increase in the magnetic flux which interlinks with the second planar coil 8, then the coupling between the coils is closer than for the case shown in FIG. 1 with an air core and no magnetic body. Consequently, the change component for the spacing between the first and second coils 5 and 8 is also increased, and hence the sensitivity of the acceleration sensor is improved.

As a method of improving the sensitivity of the acceleration sensor of the present invention which utilizes transformer coupling, methods such as increasing the amplitude of the AC current applied to the primary winding, or reducing the spacing between the primary and secondary windings can be considered.

With the former method however, if the current flowing in the primary winding is increased, then there is a problem with heat generation due to resistance (copper losses) in the primary winding, and hence the coil resistance must be reduced. To reduce the coil resistance the cross-sectional area of the coil can be increased, however if a coil with the same number of windings within the same surface area is considered, then to increase the coil cross-sectional area, only the height can be increased, and hence high aspect ratio patterning technology must be used. With this technology however processing costs increase in geometric progression with increase in aspect ratio.

With the latter method the movable distance of the mass portion is reduced and hence the measurement range becomes narrower. Furthermore, if dust enters between the primary and secondary windings, then there is the likelihood of errors occurring due to the movement of the mass portion being restricted by the dust. Since in general the probability of dust is higher the smaller the device, then if the devices are to be shipped in packaging, there is the problem of the ingress of dust during the manufacturing process. Hence if the spacing between the coils is to be small, a high degree of cleanliness is required at the manufacturing site, resulting in increased production costs.

With the method of the present invention involving provision of a magnetic body, it will be apparent from the measurements results of the characteristics illustrated below, that the problems of the abovementioned methods do not occur.

Figure 9:
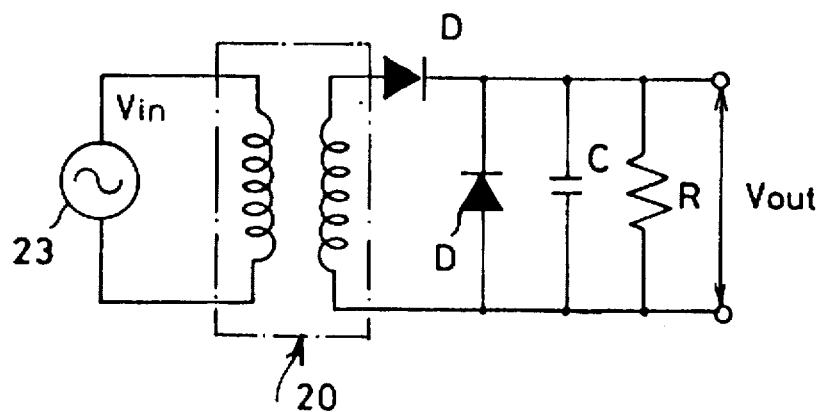
FIG. 9 is a circuit diagram used in measurement tests with the sensor section of FIG. 8.

As shown in FIG. 9 a circuit with the first planar coil 5 being connected to an AC power source 23, and with two diodes D, a capacitor C and a resistor R being connected as shown in the figure to the second planar coil 8, is used for carrying out the measurements.

If the input voltage $V_{in}$ to the first planar coil (corresponding to the primary winding) is 3 $V_{p-p}$, then compared to the case of the air core sensor section 1 of FIG. 1 where the output voltage $V_{out}$ is approximately 3 mV, in the case of the sensor section 20 of FIG. 8 with the magnetic bodies 21 and 22, an output of approximately 300 mV is obtained, being around 100 times the output. Hence sensitivity is significantly increased. Furthermore, for the same input voltage, the input impedance of the first planar coil 5 with the air core is approximately 4 ohms (1 MHz, 2 ohms being copper losses), while with the magnetic body fitted, this is approximately 45 ohms (1 MHz, 2 ohms being copper losses). The input impedance of the first planar coil 5 is thus significantly increased compared to with the air core. Consequently, for the same input voltage, the current flowing in the first planar coil 5 is one order smaller than with the air core. Therefore, the amount of heat generated in the first planar coil 5 can be significantly reduced.

More specifically, the amount of generated heat P due to resistance is represented by;

$$P=i^2R$$

Here i is the current flowing in the coil, and R is the copper loss. Since R is constant, then the amount of generated heat P becomes approximately 1/100.

Moreover, since the magnetic flux density is increased, then adequate measurement sensitivity can be obtained without reducing the spacing between the coils, thus enabling a wide measurement range.

Furthermore, if the magnetic bodies 21 and 22 are laid on the sensor section in the form of simple sheets, then processing costs can also be reduced. Also, if a material such as a commonly used ferrite is used for the magnetic bodies, then costs can be kept low, thereby minimizing any increase in costs over the air core device.

Figure 10:
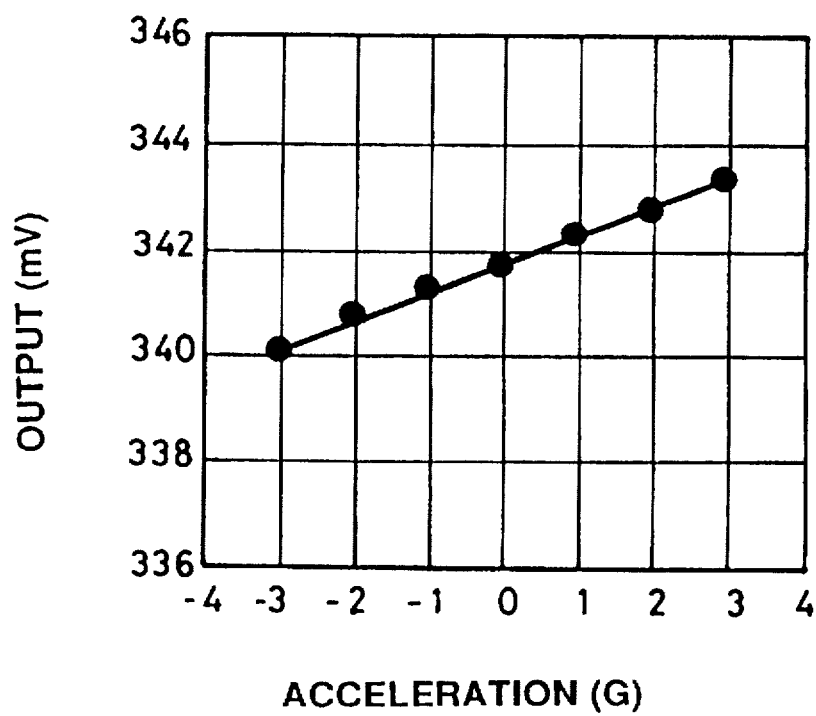
FIG. 10 is a graph showing output versus acceleration for an acceleration sensor using the sensor section of FIG. 8.

FIG. 10 shows the relationship between output voltage and acceleration, for the sensor section 20 shown in FIG. 8.

Needless to say, with the sensor section 20 of FIG. 8 also, if this is arranged as shown in FIG. 6 on each of two mutually perpendicular faces, then two dimensional acceleration detection becomes possible, while if this is arranged as shown in FIG. 7, on each of three mutually perpendicular faces, then three dimensional acceleration detection becomes possible.

With the present invention as described above, a fixed portion and a mass portion which is displaced in response to acceleration, are respectively provided with mutually opposed planar coils making up a transformer. The construction is such that a gap between the coils, that is to say the displacement of the mass portion, is detected using the magnetic coupling between the two coils. Hence compared to the conventional capacitance type device, the gap between the mass portion and the fixed portion can be significantly increased. Construction is thus simplified with no influence from dust becoming attached in the gap. Hence production costs can be reduced, and also the dynamic range is increased. Moreover, sensitivity can be freely adjusted by adjusting the number of windings in the coil. Hence high sensitivity is possible. Consequently, a highly sensitive acceleration sensor of small size and thin construction can be provided at low cost.

Since sensitivity can be controlled, then obviously low sensitivity is also possible. Hence devices can be made with sensitivity corresponding to the required use.

INDUSTRIAL APPLICABILITY

The present invention can provide a highly sensitive acceleration sensor of small size and thin construction, at low cost. It is thus possible to improve control accuracy and reduce costs of systems using acceleration sensors, and hence industrial applicability is considerable.

What is claimed is:

1. An acceleration sensor comprising: an open frame; a mass portion which is displaced in response to an acceleration, with a periphery thereof supported on said frame by means of support beams having a resilient restoring force; a first planar coil disposed on a surface normal to the displacement direction of said mass portion; and a second planar coil disposed facing said first planar coil with a space therebetween; and having a sensor section with a transformer made up of said first planar coil and said second planar coil; the construction being such that under conditions wherein an alternating current signal is applied to said first planar coil, an electrical signal proportional to a change in said space between said first planar coil and said second planar coil corresponding to acceleration is taken out from said second planar coil.

2. An acceleration sensor according to claim 1, wherein said mass portion is supported on said frame at four locations on central mutually perpendicular axes by means of said support beams.

3. An acceleration sensor according to claim 1, wherein said sensor section comprises a semiconductor substrate.

4. An acceleration sensor according to claim 1 comprising; an oscillator for applying an alternating current signal to said first planar coil of said sensor section, and an electronic circuit for computing acceleration based on an electrical signal output from said second planar coil.

5. An acceleration sensor according to claim 4, wherein said electronic circuit comprises:

a rectifying circuit for rectifying the alternating current electrical signal output from said second planar coil; an analog-digital converter for converting the rectified output from said rectifying circuit into a digital signal; and a microcomputer for computing acceleration based on the digital output from said analog-digital converter.

6. An acceleration sensor according to claim 5, wherein said rectifying circuit is a voltage doubler rectifying circuit.

7. An acceleration sensor according to claim 1, wherein said sensor section is disposed on each of two mutually perpendicular faces.

8. An acceleration sensor according to claim 1, wherein said sensor section is disposed on each of three mutually perpendicular faces.

9. An acceleration sensor according to claim 1, wherein said sensor section incorporates magnetic bodies respectively provided in the vicinity of said first planar coil and said second planar coil.

10. An acceleration sensor according to claim 9, wherein said magnetic bodies are formed as sheets laid onto the sensor section.

* * * * *